US011812760B2

(12) United States Patent
Elsby et al.

(10) Patent No.: US 11,812,760 B2
(45) Date of Patent: Nov. 14, 2023

(54) METHOD FOR ROASTING COFFEE BEANS

(71) Applicant: SOCIETE DES PRODUITS NESTLE S.A., Vevey (CH)

(72) Inventors: Kevan Arthur Elsby, Orbe (CH); Sean Mackay Murphy, Cossonay-Ville (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/620,975

(22) PCT Filed: Jun. 11, 2018

(86) PCT No.: PCT/EP2018/065261
§ 371 (c)(1),
(2) Date: Dec. 10, 2019

(87) PCT Pub. No.: WO2018/228960
PCT Pub. Date: Dec. 20, 2018

(65) Prior Publication Data
US 2020/0187518 A1    Jun. 18, 2020

(30) Foreign Application Priority Data
Jun. 14, 2017  (EP) .................................... 17176109

(51) Int. Cl.
*A23F 5/04*    (2006.01)
(52) U.S. Cl.
CPC .................................. *A23F 5/046* (2013.01)
(58) Field of Classification Search
CPC ..................................................... A23F 5/046
See application file for complete search history.

(56) References Cited

U.S. PATENT DOCUMENTS 3,109,718 A * 11/1963 Falla ..................... A23N 12/10
                                                              34/77
3,964,175 A *  6/1976 Sivetz .................... A23F 5/046
                                                              34/589

(Continued)

FOREIGN PATENT DOCUMENTS

EP        0132877         2/1985
JP      2002017323 A      1/2002

(Continued)

OTHER PUBLICATIONS

NASA, 10 interesting things about air, [online] Sep. 2016, retrieved Apr. 8, 2021. Retrieved from the Internet: URL :<https://climate.nasa.gov/news/2491/10-interesting-things-about-air/>.*

(Continued)

*Primary Examiner* — Amber R Orlando
*Assistant Examiner* — Chaim A Smith
(74) *Attorney, Agent, or Firm* — K&L Gates LLP

(57) ABSTRACT

A method for roasting coffee beans comprising the steps of a) heating the coffee beans until the temperature of the coffee beans is at least 180° C.; b) injecting a stream of oxygen-containing gas into the flow of hot air after the burner; and c) maintaining the injection of the stream of oxygen-containing gas until the end of the roasting process to mitigate the concentration of carbon monoxide in the roasting chamber, and wherein the coffee beans are roasted in a rotating fluidized bed roaster.

11 Claims, 2 Drawing Sheets

(56) References Cited

U.S. PATENT DOCUMENTS

| | | | |
|---|---|---|---|
| 4,988,590 A | | 1/1991 | Price et al. |
| 2004/0142078 A1 | | 7/2004 | Eichner |
| 2018/0255802 A1 | * | 9/2018 | Yamamoto ............. A23N 12/08 |

FOREIGN PATENT DOCUMENTS

| | | |
|---|---|---|
| JP | 2002330699 A | 11/2002 |
| JP | 2003047405 A | 2/2003 |
| RU | 2735866 C2 | 11/2020 |
| WO | 2017033676 | 3/2017 |

OTHER PUBLICATIONS

Russia Patent Office Communication for Application No. 2020100231/10(000341) dated Oct. 22, 2021, 13 pages.

Japan Patent Office Communication for Application No. P2019-565441, Dispatch No. 154512, dated Apr. 5, 2022, 4 pages.

"Coffee Roasting", Wikipedia, Retrieved from <URL: https://en.wikipedia.org/wiki/Coffee_roasting>, Dec. 15, 2005, pp. 1-11.

Australian Office Action for Appl No. 2018285143 dated Sep. 20, 2022.

* cited by examiner

METHOD FOR ROASTING COFFEE BEANS

CROSS REFERENCE TO RELATED APPLICATIONS

The present application is a National Stage of International Application No. PCT/EP2018/065261, filed on Jun. 11, 2018, which claims priority to European Patent Application No. 17176109.1, filed on Jun. 14, 2017, the entire contents of which are being incorporated herein by reference.

FIELD OF THE INVENTION

The present invention relates to a method for roasting coffee beans at industrial scale to achieve extra dark roast colour with safe roasting conditions.

BACKGROUND OF THE INVENTION

Any discussion of the prior art throughout the specification should in no way be considered as an admission that such prior art is widely known or forms part of common general knowledge in the field.

Roasting is a process commonly applied to manufacture flavourful and tasty beverages from plant material (e.g. coffee, chicory, cereal, cocoa) leading to colour development, aroma and flavour generation. Roasting of coffee beans brings out aroma and flavour from precursors present in the green coffee beans.

Regardless of the roasting method used, the initial stage of roasting requires considerable energy input that is driving evaporation of water and induces chemical reactions in an endothermic phase. As roasting develops, the energy balance changes and roasting becomes exothermic with pyrolysis of beans. Roasting often needs to be stopped through rapid cooling at the desired degree of roast to avoid that roasting continue in an exothermic manner which can results in over-roasting of the coffee beans and when the roasting continues, the risk increases rapidly of unsafe conditions in the roaster resulting for example in the coffee beans catching fire. Consequently, careful control of the process is crucial at the end of roasting to avoid over-roasted beans and to ensure safety along the entire roasting process, notably at industrial scale. Careful control of roasting for extra dark coffee is especially difficult at industrial scale due to the larger quantities of coffee roasted and therefore the risks of larger roaster fires or even explosions.

Significant amount of gases, including carbon dioxide ($CO_2$) and carbon monoxide (CO), are generated during roasting as a result of Maillard reaction and pyrolysis. The gas formation rate is low at the beginning of the roasting process but accelerates rapidly as coffee bean temperature increases. The rate and nature of gas formation is, however, very dependent on the roasting conditions. One part of the gases is released into the roasting chamber during roasting and another part is entrapped into the beans and will only be released later during storage or during further processing steps (for example grinding).

Roasting at industrial scale using drum roasters or paddle roasters has the drawback that the roasting temperature profile and the uniformity of roasting are difficult to measure and control.

Rotating fluidized bed (RFB) roasters allow improved roasting temperature measurement and control with improved uniformity of roast as compared to drum and paddle roasters. U.S. Pat. No. 3,964,175 describes a roasting method for transferring efficiently heat from air to the coffee beans, thereby improving the quality of roasting.

The degree of roasting is one of the important factor that determines the taste and aroma of the coffee beverage. One common way to describe the degree of roasting is by the colour of the roasted coffee beans, ranging from light to dark (or extra dark). However, the roasting colour can vary depending for example on the coffee origin, and therefore roasting colour by itself is not completely reliable way to judge roasting degree. It is of interest to cover the entire range of roast degree, from light to extra dark roast colour, at industrial scale as each roasting degree is associated with a different flavour profile, ranging from fruity and acid for light roasts to bitter and burnt for extra dark roasted coffee.

Nowadays, there are limitations regarding the maximum dark roasting colour that can be achieved at industrial scale, especially to achieve extra dark roasting degree. Indeed, roasting conditions required to achieve darker roasting colour have the issue that concentration of hot combustion gases, notably concentration of carbon monoxide, would accumulate in the roasting chamber up to dangerous levels that can results into unsafe roasting conditions.

Patent WO201733676 describes a method for measuring the concentration of carbon monoxide generated from roasting coffee beans and to adapt the process conditions by stopping the supply of the heat. However, for any roaster type, it remains difficult to control and decrease the roasting air temperature of the roasting chamber quickly just by decreasing the power from the burner, and thereby decreasing the temperature of the stream of combustion gases circulating in the roasting chamber, because there are limits to how fast the energy delivered by the burner can be reduced at industrial scale. In any case, when coffee roasting has entered the exothermic, pyrolytic phase of roasting, there can be sufficient energy from the burning of the beans to drive further pyrolysis. Furthermore, when oxygen levels in the roaster are reduced in the exothermic, pyrolytic phase of roasting, then carbon monoxide levels often rise extremely quickly, making it more difficult to control a hazardous situation.

Therefore, there is a need to have the possibility to roast the coffee beans to achieve extra dark colour at industrial scale while ensuring safe roasting conditions along the entire roasting process, and in particular toward the end of the roasting process, while avoiding burnt taste that is usually associated to extra dark roasted coffee beans.

SUMMARY OF THE INVENTION

The inventors have found that a method for roasting coffee beans wherein a stream of oxygen-containing gas is continuously injected into the flow of hot air after the burner allows mitigation of the level of hot combustion gases, in particular carbon monoxide, within the roasting chamber and thereby allows roasting of coffee beans to extremely dark roasting color while ensuring safe roasting conditions during the entire roasting process.

Accordingly, the present invention provides a method for roasting coffee beans comprising the steps of
  a) heating the coffee beans until the temperature of the coffee beans is at least 180° C.;
  b) injecting a stream of oxygen-containing gas into the flow of hot air after the burner; and
  c) maintaining the injection of the stream of oxygen-containing gas until the end of the roasting process to mitigate the concentration of carbon monoxide in the roasting chamber, and wherein the coffee beans are roasted in a rotating fluidized bed roaster.

Another aspect of the present invention provides a method for roasting coffee beans wherein the stream of oxygen-containing gas injected into the flow of hot air after the burner comprises at least 5 wt % oxygen.

Yet another aspect of the present invention provides a method for roasting coffee beans wherein a stream of air is maintained in the roasting chamber until the end of the roasting process such that the concentration of carbon monoxide in the roasting chamber is below 8000 ppm until the end of the roasting process.

BRIEF DESCRIPTION OF THE FIGURES

The present invention is further described hereinafter with reference to some of its embodiments shown in the accompanying drawings in which.

DETAILED DESCRIPTION OF SOME EMBODIMENTS OF THE INVENTION

Figure 1:
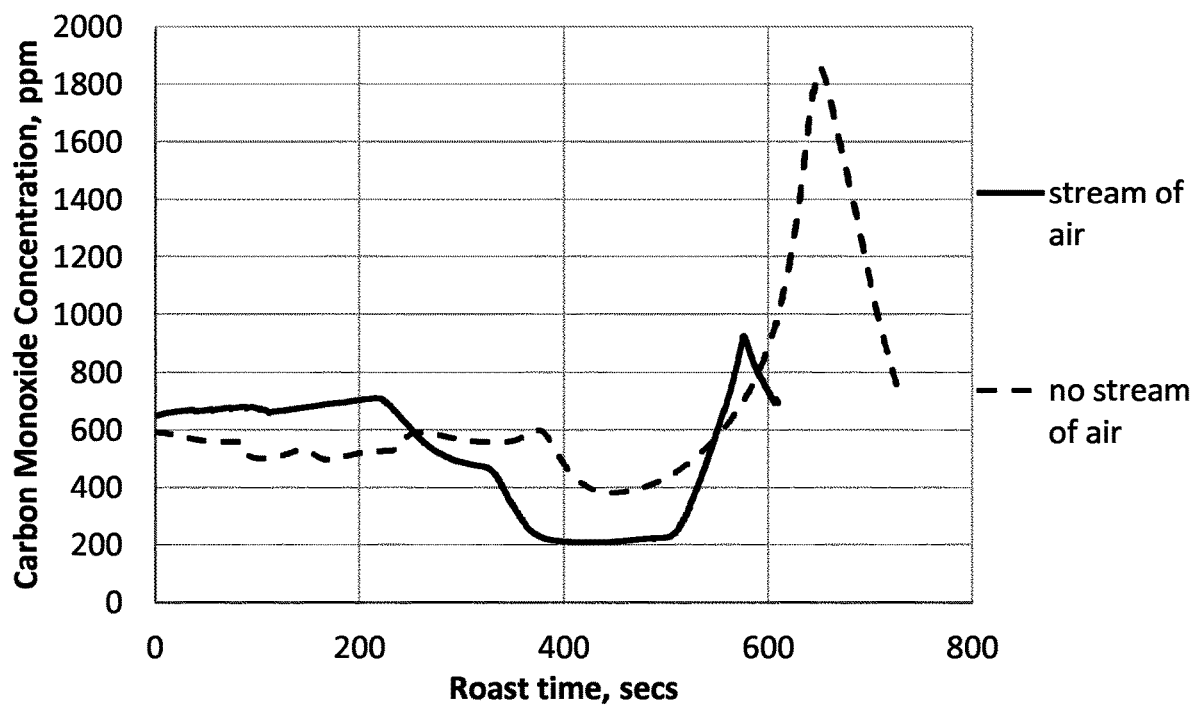
FIG. 1 shows the concentration of carbon monoxide circulating into the roasting chamber when a stream of oxygen-containing gas is injected after the burner according to the present invention as compared to the concentration of carbon monoxide without injection of a stream of oxygen-containing gas.

In the specification, the following terms or expression are given a definition that must be taken into account when reading and interpreting the description, examples and claims.

The expression "temperature of the coffee beans" refers to the temperature of the coffee beans as measured using sensor(s) that is (are) arranged in the roasting chamber such as the sensor(s) is (are) in contact with the coffee beans during roasting to measure the temperature of the coffee beans. However, depending on their arrangement, the sensor(s) may also be in contact with hot air and therefore the temperature measured may represent a mix temperature of bean surface and hot air.

The term "CTn" refers to an empirical unit lying between 0 and 200 that characterizes the intensity of Infrared (IR) light (904 nm) that is back scattered by the sample when measured with a spectrophotometer, such as Neuhaus Neotec's ColorTest II®. The spectrophotometer illuminates the surface of the grounded sample with monochromatic IR light at a wavelength of 904 nm from a semi-conductor source. A photo-receiver, which has been calibrated, measures the amount of light reflected by the sample. The mean value series of measurement is calculated and displayed by electronic circuit. The colour of the coffee beans is directly related to its roast level. For example, green coffee beans have typically a CTn of above 200, extremely lightly roasted coffee beans have typically a CTn of around 150, lightly roasted coffee beans have typically a CTn around 100 and medium-dark coffee beans have typically a CTn of around 70. Very dark roasted coffee beans have typically a CTn around 45.

The term "hot combustion gases" refers to the heated air (or hot air) that circulates into the roasting chamber during combustion and/or roasting. The hot combustion gases comprise a combination of gas components that are generated by the burner and of gas components that are generated by coffee beans during roasting, such as carbon dioxide and/or carbon monoxide and/or nitrogen oxides.

The expression "roasting temperature profile" refers to the change in temperature of coffee beans during roasting. The roasting temperature profile is the result of a sequence of different heating steps during roasting. Each step may comprise a change in the roasting air temperature and/or air flow rate, for example.

The expression "ambient temperature" has to be understood as the typical indoor temperature to which people are generally accustomed. In the scientific and technical context, the ambient temperature is commonly acknowledged to be 20° C.

All percentages are by weight unless otherwise stated. The expressions "weight %" and "wt %" are synonymous. They refer to quantities expressed in percent on a dry weight basis.

It is noted that the various aspects, features, examples and embodiments described in the present application may be compatible and/or combined together.

As used in the specification, the words "comprises", "comprising" are not to be interpreted in an exclusive or exhaustive sense. In other words, they are intended to mean "including, but not limited to".

The inventor have found that a method of roasting coffee wherein oxygen-containing gas is continuously injected into the flow of hot air after the burner roasting allows achieving, at industrial scale, extra dark roasting colour safely and without undesired over-roasted taste.

Therefore, one aspect of the present invention provides a method for roasting coffee beans comprising the steps of
a) heating the coffee beans until the temperature of the coffee beans is at least 180° C.;
b) injecting a stream of oxygen-containing gas into the flow of hot air after the burner; and
c) maintaining the injection of the stream of oxygen-containing gas until the end of the roasting process to mitigate the concentration of carbon monoxide in the roasting chamber,
and wherein the coffee beans are roasted in a rotating fluidized bed roaster.

Traditionally, roasting can be characterized by two important phases, namely the first crack and the second crack. The first phase of roasting is endothermic, meaning heat absorbing. In this step, the coffee beans are dried and develop a yellow colour. As the temperature increases, water within the beans forms steam and therefore pressure builds in the beans resulting in size expansion leading to ruptures of the cells within the beans. This creates an audible pop or crack, called the "first crack", that usually occurs at approximatively 205° C. In this phase, the beans develop a light brown colour and are subjected to weight loss of approximatively 5 wt %. In a second phase of the roasting which is exothermic, meaning generating heat, chemical composition of the beans changes upon pyrolysis and Maillard reaction and a second crack is produced by the increase of pressure in the beans caused by the formation of hot combustion gases such as carbon dioxide, carbon monoxide and nitrogen oxides. The second crack usually happens at temperatures between 225° C. and 230° C.

In the first step a) of the present invention, the coffee beans are heated in the roasting chamber until the temperature of the coffee beans is at least 180° C. During step a) of the present invention the coffee beans are then dried and the roasting reaction is initiated. In step a) of the present invention, the roasting reaction is still in the endothermic phase and has not yet become exothermic. The temperature of the coffee beans is measured using sensor(s) that is (are) arranged in the roasting chamber.

In another embodiment of the present invention, the coffee beans are heated until the temperature of the coffee beans is at least 180° C., or at least 185° C. or at least 190° C. In yet another embodiment, the coffee beans are heated until the temperature of the coffee beans is comprised between 180° C. and 250° C., or between 180° C. and 240° C., or between 180° C. and 230° C.

Roasting of coffee beans can be achieved using hot air as thermal process. The hot air used for roasting can be for example generated by any type of burner known in the art and be then transferred by means of a fan into the roasting chamber to heat the coffee beans. The combustion taking place in the burner generates hot combustion gases which then accumulates into the roasting chamber while roasting progresses with the hot combustion gases generated by the roasting of coffee beans.

In the second step b) of the method according to the present invention, a stream of oxygen-containing gas into the flow of hot air after the burner. The stream of oxygen-containing gas can therefore be injected into the flow of hot air after the burner before or during the exothermic phase.

In one embodiment of the present invention, the oxygen-containing gas is ambient air that is injected into the flow of hot air after the burner. In some cases, the oxygen-containing gas is air that has not been heated through combustion.

In one embodiment of the present invention, the injection of a stream of oxygen-containing gas into the flow of hot air after the burner is started when the temperature of the coffee beans is between 180° C. and 240° C.

The concentration of carbon monoxide will increase sharply when oxygen is depleted as roasting continues and the concentration of carbon monoxide can reach concentration that can be dangerous. Therefore, injecting a stream of oxygen-containing gas into the flow of hot air after the burner has the effect of mitigating efficiently the concentration of carbon monoxide since it prevents oxygen depletion as the roasting progresses. Consequently, the roasting of the coffee beans can be carried out even to extra dark roast colour without any risk inherent related to elevated levels of the carbon monoxide into the roasting chamber, such as explosion.

In one aspect of the present invention, the stream of oxygen-containing gas injected into the flow of hot air after the burner comprises at least 5 wt % oxygen. In another embodiment, the stream of oxygen-containing gas injected into the flow of hot air after the burner comprises between 5 wt % to 100 wt % oxygen.

The stream of oxygen-containing gas that is injected into the flow of hot air coming from the burner can be adapted depending on the type of burner used and the amount of coffee charged into the roasting chamber in order to mitigate efficiently the concentration of carbon monoxide in the roasting chamber. For example, the stream of oxygen-containing gas can be equilibrated in such a way that the injection of the stream of oxygen-containing gas does not negatively impact the energy input necessary to achieve the desired roast colour and taste but is sufficient to avoid the sharp increase in the concentration of carbon monoxide happening as the roasting process progresses. The injection of oxygen-containing gas in the roasting chamber is not designed to control the roasting temperature profile but is mainly designed to mitigate the concentration of carbon monoxide in the roasting chamber. Therefore, the temperature of the stream of oxygen-containing gas or the volume of oxygen-containing gas can be adjusted to efficiently mitigate the concentration of the carbon monoxide.

In one embodiment of the present invention, the stream of oxygen-containing gas injected into the flow of hot air after the burner has a temperature below the temperature of the hot air into the roasting chamber.

In another embodiment, the stream of oxygen-containing gas injected into the flow of hot air after the burner has a temperature below 180° C.

In yet another embodiment, the stream of oxygen-containing gas injected into the flow of hot air after the burner is at ambient temperature.

For example, the stream of oxygen-containing air can be air at ambient temperature, or air that has been heated a temperature below the temperature of the hot air into the roasting chamber or can be air that has been cooled down. The injection of a stream of oxygen-containing gas having a temperature lower than the temperature of hot air used for the thermal treatment may in some extent impact the temperature in the roasting chamber.

In one embodiment of the present invention, the volume of oxygen-containing gas injected into the flow of hot air after the burner is adjusted to mitigate the concentration of carbon monoxide in the roasting chamber. The volume of oxygen-containing gas can be adjusted taking in consideration for example the type of roaster and/or the roasting temperature profile, and/or the amount of coffee loaded into the roasting chamber.

In the third step c) of the present invention, the injection of the stream of oxygen-containing gas is maintained until the end of the roasting process to mitigate the concentration of carbon monoxide in the roasting chamber.

As previously mentioned, the concentration of carbon monoxide can accumulate as the roasting continues and this concentration can reach levels that can be dangerous. Therefore, maintaining the injection of the stream of oxygen-containing gas until the end of the roasting process results in the prevention of the risks inherent to elevated concentration of carbon monoxide into the roasting chamber.

In another embodiment, the stream of oxygen-containing gas is maintained in the roasting chamber until the end of the roasting process such that the concentration of carbon monoxide in the roasting chamber is below 8000 ppm until the end of the roasting process. Keeping the level of carbon monoxide below 8000 ppm allows achieving roasting conditions resulting in extra dark roast colour at industrial scale with safe roasting conditions.

The present invention allows achieving extra dark roast colour at industrial scale with safe roasting conditions. Therefore, in one embodiment, the amount of coffee beans roasted loaded into the roasting chamber is at least 25 kg.

Coffee beans may be roasted in drum or paddle roasters. However, these types of roasters do not allow uniform roasting of the coffee beans due to the difficulty to vary rapidly the temperature of the roasters. Therefore, in the method of the present invention, the coffee beans are preferably roasted in a rotating fluidized bed (RFB) roaster. This has the advantage that coffee beans are uniformly roasted as roasting temperature profiles are better controlled. The coffee beans are roasted using roasting temperature profile known in the art in order to obtain the desired roast colour and targeted taste.

One embodiment of the present invention provides a method for roasting coffee beans comprising the steps of
   a) heating the coffee beans until the temperature of the coffee beans is at least 180° C.;

b) injecting a stream of oxygen-containing gas into the flow of hot air after the burner; and
c) maintaining the injection of the stream of oxygen-containing gas until the end of the roasting process to mitigate the concentration of carbon monoxide in the roasting chamber such that the concentration of carbon monoxide in the roasting chamber is below 8000 ppm until the end of the roasting process, and wherein the coffee beans are roasted in a rotating fluidized bed roaster.

Another embodiment of the present invention provides a method for roasting coffee beans comprising the steps of
a) heating the coffee beans until the temperature of the coffee beans is at least 180° C.;
b) injecting a stream of ambient air into the flow of hot air after the burner; and
c) maintaining the injection of the stream of oxygen-containing gas until the end of the roasting process to mitigate the concentration of carbon monoxide in the roasting chamber such that the concentration of carbon monoxide in the roasting chamber is below 8000 ppm until the end of the roasting process, and wherein the coffee beans are roasted in a rotating fluidized bed roaster.

An additional embodiment of the present invention provides a method for roasting coffee beans comprising the steps of
a) heating the coffee beans until the temperature of the coffee beans is at least 180° C.;
b) injecting a stream of oxygen-containing gas into the flow of hot air after the burner, wherein the stream of oxygen-containing gas comprises at least 5 wt % oxygen; and
c) maintaining the injection of the stream of oxygen-containing gas until the end of the roasting process to mitigate the concentration of carbon monoxide in the roasting chamber such that the concentration of carbon monoxide in the roasting chamber is below 8000 ppm until the end of the roasting process, and wherein the coffee beans are roasted in a rotating fluidized bed roaster.

In one embodiment of the present invention, the stream of oxygen-containing gas is introduced in the roasting chamber using a proportioning valve which is positioned in the apparatus for providing and feeding air to the roasting chamber. The valve opens when the temperature of the coffee beans is at least 180° C. and remains opened until the end of the roasting process. Typically, the proportioning valve must be opened in such a way that the stream of air injected in the roasting chamber allows mitigation of carbon monoxide to ensure safe roasting conditions but without resulting in unnecessary loss in energy.

Roasting degree can be commonly categorized using roasted bean colours that range from light to dark (or extra dark), each of the colour levels being associated with a different flavour profile. Light roasts are light brown in colour, with a light body and no oil on the surface of the beans. Light roast have usually a toasted taste and pronounced acidity. Light roasted beans usually reach product temperatures between 180° C. to 205° C. during roasting. Medium roasted coffee are medium brown in colour with more body that light roasts, with no oil in the surface of the bean. Medium roast exhibits more balanced flavour, aroma and acidity. Medium roasted coffee beans usually reach product temperatures between 210° C. and 220° C. during roasting. Medium to dark roasts have a darker colour with some oil beginning to show on the surface of the beans. Medium to dark roasted beans have a heavy body in comparison with the light or medium roasts. Flavours and aromas of roasting are more pronounced. The medium to dark roasted beans usually reach an internal temperature of about 225° C.-230° C. during roasting. Finally, extra dark roasts are dark brown in colour or sometimes even almost black. The beans have a sheen of oil on the surface, which is usually is usually visible in the cup when extra dark coffee is brewed. Extra dark roasted coffee beans have usually a bitter, smoky or even burnt taste and is characterized by flavour of tar and charcoal. Extra dark roasted coffee beans usually reach product temperatures exceeding 250° C. during roasting.

The inventors have interestingly found that the injection of the stream of oxygen-containing gas in the roasting chamber during roasting according to the method as claimed also allows controlling roasting conditions resulting in extra dark roast colour while avoiding the bitter and burnt/smoky taste that is usually associated to extra dark roasted coffee beans. Indeed, the extra dark roasted coffee beans have low bitter/burned/smoky taste and are more aromatic taste that is usually associated with lighter roasted coffee beans.

The extra dark roasted coffee beans can be advantageously used as ingredient for blending with coffee having other roast colour.

The present invention allows achieving safely extra dark roasting degree at industrial scale. In one embodiment of the present invention, the coffee beans are roasted to a final colour of below CTn 45. In another embodiment, the coffee beans are roasted to a final colour of below CTn 40. In yet another embodiment, the coffee beans are roasted to a final colour between CTn 45 and CTn 10.

Coffee beans used in the present invention are raw coffee beans that have not been subjected to severe heat treatment. The raw coffee beans may however been subjected to a pre-treatment before roasting, including but not restricted to thermal heat treatment (pre-heating), chemical or enzymatic pre-treatment. Therefore, in one embodiment of the present invention, the coffee beans are selected from the group comprising green coffee beans, steam treated green coffee beans, enzymatically treated green coffee beans, decaffeinated green coffee beans, green coffee beans pre-heated to between 30° C. and 140° C. and roasted coffee beans to above CTn 120.

The invention is further described with the reference to the following examples. It will be appreciated that the invention as claimed is not intended to be limited in any way by these examples.

EXAMPLE 1

Carbon Monoxide is measured by a SICK GM901 Carbon Monixide gas analyser.

The roasting degree of the roasted coffee beans was determined by colour measurement with Neuhaus Neotec ColorTest II® (Neuhaus Neotec™). The roasting degree of the coffee beans is inversely proportional to the CTn values. A sample of 100 g of roasted coffee beans was collected from the roaster and allowed to reach room temperature. The sample was milled using a Ditting grinder to an average particle size between 800 and 1000 µm. The freshly ground coffee was homogenized by mixing, and 40 g of the grounded coffee were poured in a measuring sample cup and the surface was carefully flattened. The sample cup was then placed into the tray of the ColourTest II® instrument and the CTn value was measured. Result of the CTn values were expressed as the average of duplicates to the closest highest CTn unit. The lower the CTn value, the darker the coffee.

A Neuhaus Neotec RG 30™ fluidized bed roaster was used to roast 30 kg of Vietnamese robusta coffee. Roast time from charge of green coffee to discharge of roast coffee from the roast chamber was 585 seconds. A final roast colour of CTn of 53 was produced in the final product. This is the darkest recommended color to roast to according to the manufacturer when using the roaster in a "standard" mode of operation, normally stated as CTn of 55. The coffee beans were heated until the temperature of the coffee beans is 193° C. The stream of oxygen-containing gas (ambient air) was continuously injected after the burner by opening the proportioning valve to a value of 25% (see FIG. 1, black line).

As control trial, A Neuhaus Neotec RG 30™ fluidized bed roaster was used to roast 30 kg of Vietnamese Robusta coffee. Roast time from charge of green coffee to discharge of roast coffee from the roast chamber was 615 seconds. A final roast colour of CTn of 54 was produced in the final product. No oxygen-containing gas was injected (see FIG. 1, dotted line).

Example 1 and FIG. 1 illustrates that the concentration of carbon monoxide in the roasting chamber is efficiently decreased when the method of the present invention is applied as compared to concentration of carbon monoxide when no stream of air is injected during roasting.

EXAMPLE 2

A Neuhaus Neotec RG 30™ fluidized bed roaster was used to roast 25 kg of Vietnamese robusta coffee for three different runs to produce extra dark roasted coffee. Roast times from charge of green coffee to discharge of roast coffee from the roast chamber of 483, 509 and 536 seconds were used. The coffee beans were heated until the temperature of the coffee beans is 205° C. The stream of oxygen-containing gas (ambient air) was continuously injected after the burner by opening the proportioning valve to a value of 25%. Final roast colours of CTn of 30, 21, and 12 respectively were produced (see FIG. 2). These roast colours are well below the darkest recommended color to roast to according to the manufacturer when using the roaster in a "standard" mode of operation, normally stated as 55 CTN. For evident safety reasons, no industrial trial can be made to achieve extra dark roast colours without the method according to the present invention.

Figure 2:
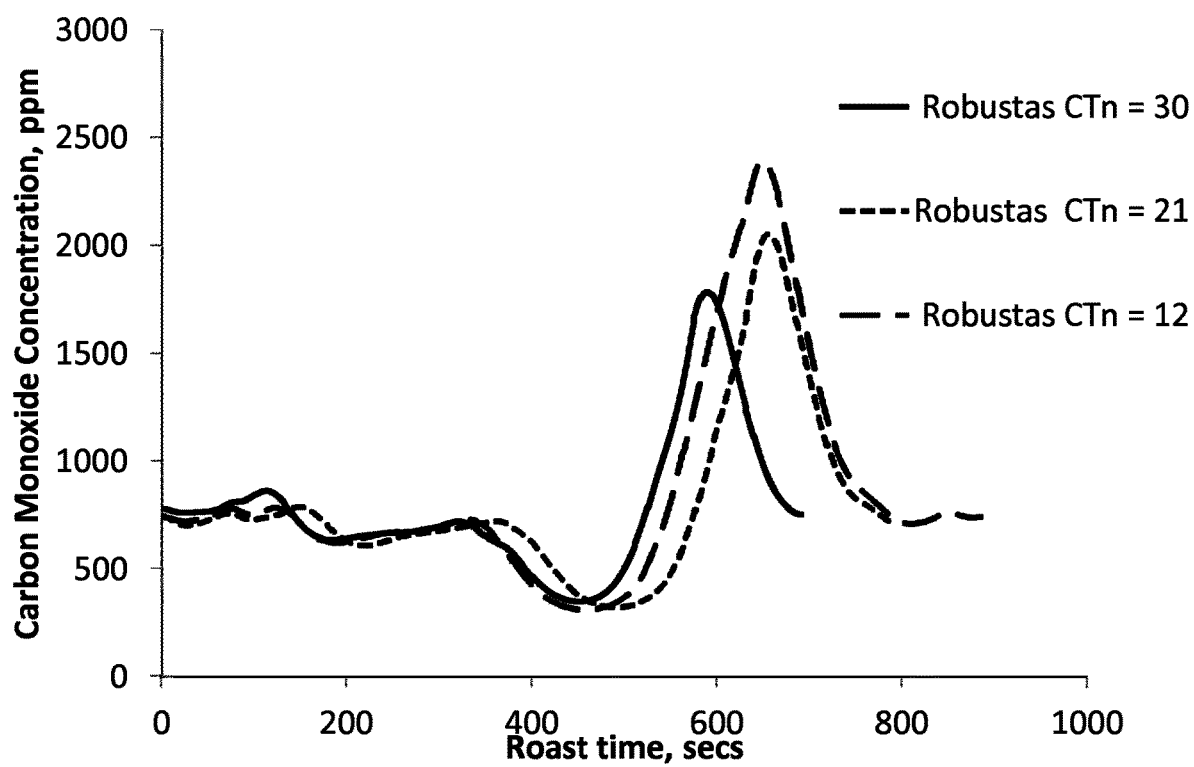
FIG. 2 shows the concentration of carbon monoxide circulating into the roasting chamber for different roasting temperature profiles allowing achieving different extra dark coffee bean roasting colours.

Example 2 and FIG. 2 illustrates that the concentration of carbon monoxide in the roasting chamber when the method of the present invention is applied is efficiently mitigated and allows achieving extra dark roast colours (i.e. below CTn of 40).

The invention claimed is:

1. A method for roasting coffee beans in a roaster comprising a roasting chamber, the method comprising:
generating, by a burner, hot air which then is transferred into the roasting chamber;
heating the coffee beans by the hot air until a temperature of the coffee beans is at least 180° C.;
injecting a stream of oxygen-containing gas into a flow of the hot air generated by the burner downstream from the burner starting when the temperature of the coffee beans is between 180° C. and 250° C.;
adjusting a volume of the oxygen-containing gas injected into the flow of hot air to an amount effective to mitigate the concentration of carbon monoxide in the roasting chamber based on at least one of the type of the roaster, a roasting temperature profile, and/or an amount of the coffee beans loaded into the roasting chamber; and
maintaining the injection of the stream of oxygen-containing gas until the end of a roasting process to mitigate a concentration of carbon monoxide in the roasting chamber,
the roaster is a rotating fluidized bed roaster, and the coffee beans are roasted to a final color of below CTn 45.

2. The method according to claim 1, wherein the stream of oxygen-containing gas injected into the flow of the hot air downstream from the burner comprises at least 5 wt % oxygen.

3. The method according to claim 1, wherein the stream of oxygen-containing gas injected into the flow of the hot air downstream from the burner has a temperature below a temperature of a hot air in the roasting chamber.

4. The method according to claim 1, wherein the stream of oxygen-containing gas injected into the flow of the hot air downstream from the burner has a temperature below 180° C.

5. The method according to claim 1, wherein the stream of oxygen-containing gas is maintained in the roasting chamber until the end of the roasting process such that the concentration of carbon monoxide in the roasting chamber is below 8000 ppm until the end of the roasting process.

6. The method according to claim 1, wherein the stream of oxygen-containing gas is introduced in the roasting chamber using a proportioning valve.

7. The method according to claim 1, wherein an amount of coffee beans loaded into the roasting chamber is at least 25 kg.

8. The method according to claim 1, wherein the coffee beans are selected from the group consisting of green coffee beans, stem treated green coffee beans, enzymatically treated green coffee beans, decaffeinated green coffee beans, green coffee beans pre-heated to between 30° C. and 40° C., roasted coffee beans to above CTn 120, and mixtures thereof.

9. The method according to claim 1, wherein the coffee beans are roasted to a temperatures above 250° C.

10. The method according to claim 1, wherein the coffee beans are roasted to a final color of below CTn 40.

11. The method according to claim 1, wherein the coffee beans are roasted to a final color between CTn 45 and CTn 10.

* * * * *